Oct. 18, 1960      E. PINDER      2,956,596
SLASHER SAWS

Filed April 14, 1958      2 Sheets-Sheet 1

INVENTOR
Edison Pinder
BY Alex. E. MacRae
ATTORNEY

Oct. 18, 1960
E. PINDER
2,956,596
SLASHER SAWS
Filed April 14, 1958
2 Sheets-Sheet 2
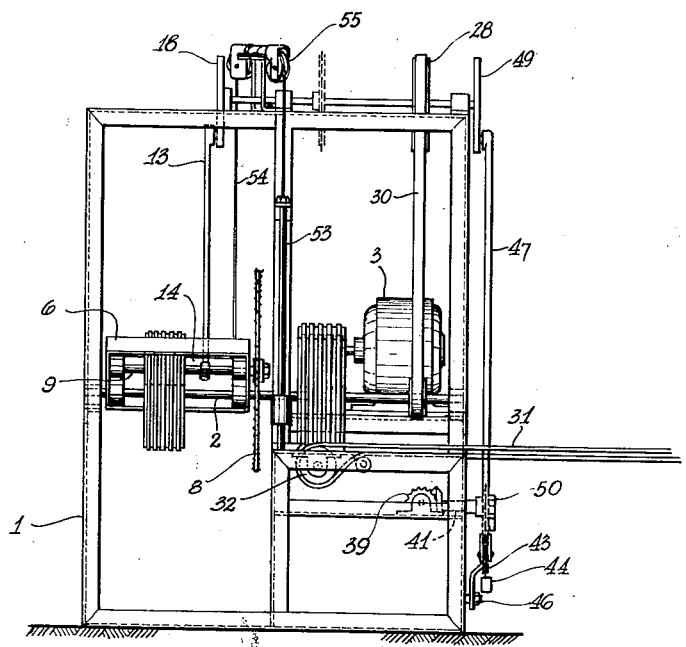
Fig-3-
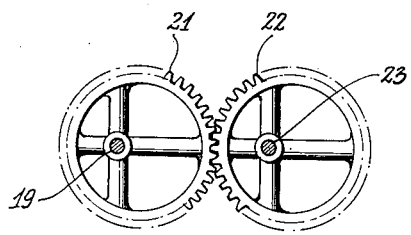
Fig-4-
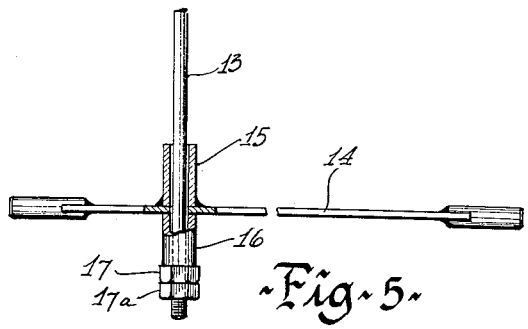
Fig-5-
INVENTOR
Edison Pinder
BY Alex E. MacRae
ATTORNEY

United States Patent Office 2,956,596
Patented Oct. 18, 1960

2,956,596
SLASHER SAWS

Edison Pinder, 29 Grandview Ave., Sault Ste. Marie, Ontario, Canada

Filed Apr. 14, 1958, Ser. No. 728,227

1 Claim. (Cl. 143—46)

This invention relates to slasher saws.

Slasher saws are employed in saw mills where it is desirable to cut slabs and edgings to short lengths. Usually such saws are of complicated and costly construction and there are many small mills where the production of lumber does not warrant the installation of such saws or other equipment of high price range.

It is an object of this invention to provide a slasher saw of simple and inexpensive structure, which is simple and substantially automatic in operation, which may be sturdily constructed for long life and easy maintenance, which is capable of handling a large quantity of wood per day, and which may be readily adjusted to cut wood to various lengths as may be required.

The invention resides broadly in the provision of a slasher saw comprising a main frame, an auxiliary frame swingably mounted in said main frame, a circular saw having an arbor mounted in said auxiliary frame, a driven shaft journalled in said main frame, driving means connecting said arbor and said shaft, said auxiliary frame and saw being swingable in an up and down path, a wood conveyor having a discharge and directed across said path, means for actuating said conveyor, a connecting rod attached to said conveyor actuating means and reciprocal to impart periodical movement to said conveyor, a connecting rod attached to said auxiliary frame and reciprocal to move said auxiliary frame in said up and down path, and driving means connected to said shaft to reciprocate said connecting rods.

Figure 1:
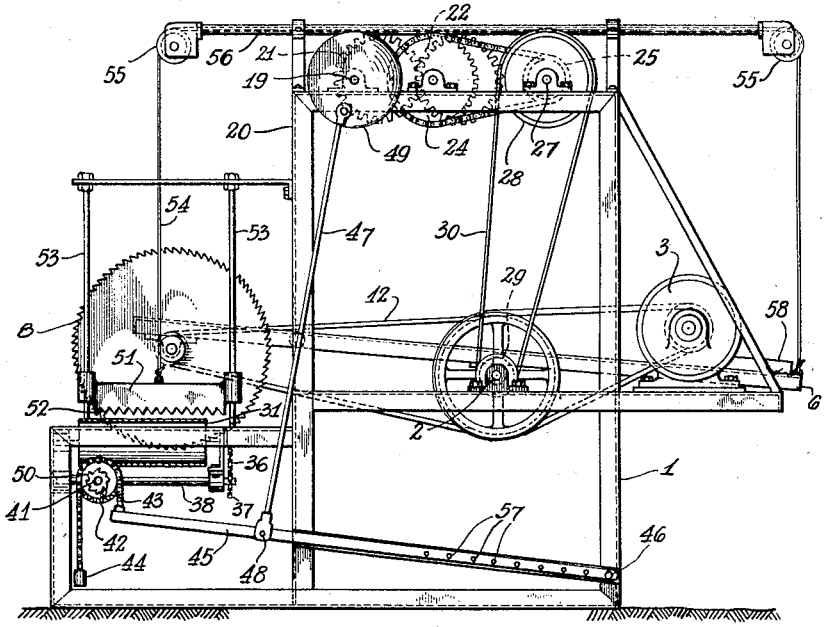
Figure 2:
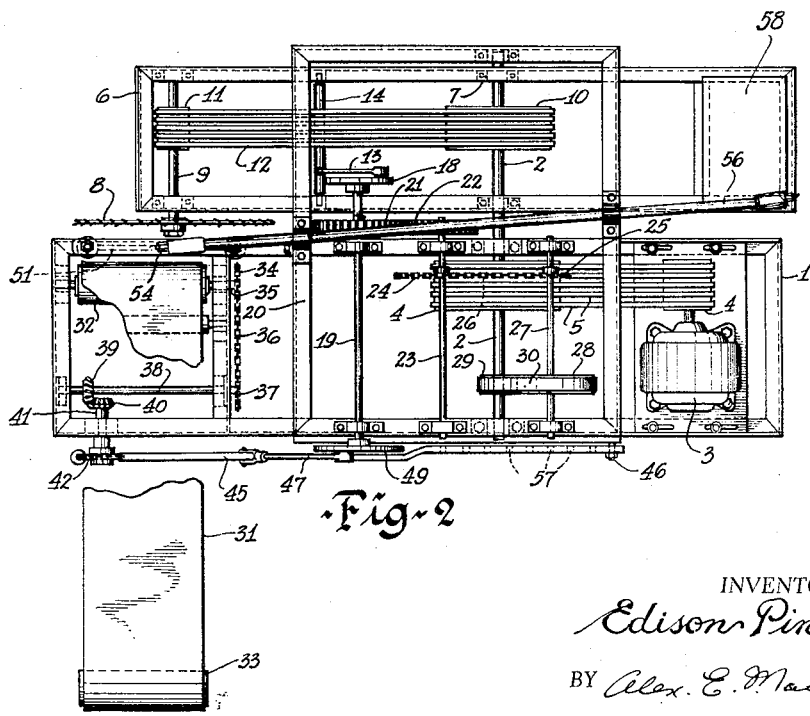

The invention will be described with reference to the accompanying drawings, in which, Figure 1 is a side elevation of a slasher sawing machine in accordance with the invention, Figure 2 is a plan view of the machine shown in Figure 1, Figure 3 is an end elevation of the machine shown in Figure 1, Figure 4 is an enlarged side elevation of a gear arrangement of the machine, and Figure 5 is an enlarged elevation of a connecting rod mounting.

In the drawing, 1 is a main frame on which is journalled a horizontally arranged shaft 2. The shaft may be driven in any suitable manner as by a motor 3 also mounted on frame 1, sheaves 4 and belts 5.

An auxiliary frame 6 is pivotally mounted on the main frame for swinging up and down movement with respect thereto. This is conveniently effected by means of bearings 7 on the frame 6 through which shaft 2 extends. Adjacent one end of frame 6 is rotatably mounted a circular saw 8 with arbor 9. The saw is driven at desired speed by means of sheaves 10 on shaft 2, sheaves 11 on arbor 9 and belts 12.

Means for imparting reciprocal movement to the auxiliary frame 6 and saw 8 comprises a connecting rod 13 from which the saw end of the frame 6 is suspended and one end of which extends through a cross member 14 pivotally carried by frame 6. Preferably, in order to prevent jamming of the saw on its downward or working stroke, the connecting rod is freely slidable with respect to the cross member 14 following engagement of the saw with the wood piece to be sawn during the downward stroke of the connecting rod but acts to pick up the frame 6 and saw 8 and raise it during the upward stroke thereof. To this end, the rod 13 extends freely through a tubular member 15 fixed to member 14 on one side thereof and through a filler tubular member 16 on the other side thereof. A nut 17 and locknut 17a position the filler member 16 on the rod 13. It will be apparent that the filler member 16 may be replaced with a filler member of different length to permit use of saws of various sizes or to compensate for wear of the saw.

The connecting rod 13 is connected eccentrically to a disc 18 mounted for rotation with a shaft 19 journalled on an elevated portion 20 of the main frame 1. Shaft 19 with disc 18 are driven by means of gears 21 and 22 from a shaft 23 also journalled in frame portion 20. Shaft 23 is in turn driven by means of sprockets 24 and 25 and chain 26 from a shaft 27 journalled in frame portion 20. Shaft 27 is driven from the main shaft 2 by means of pulleys 28 and 29 and belt 30.

Gears 21 and 22 are eccentrically mounted on respective shafts 19 and 23, as shown in Figure 4, whereby the auxiliary frame and saw are lowered into the cut at half the speed of the up stroke. Conversely, the saw and auxiliary frame are brought out of the cut at double the speed of the downward stroke, thus increasing the cutting capacity of the machine by 50% over a machine having a constant speed of up and down strokes. The free end of the auxiliary frame is provided with a counterweight or counterweight receiving means 58.

Means for conveying wood pieces into the path of the saw for sawing during the downward or working stroke thereof comprises a belt conveyor 31 mounted on rollers 32 and 33. Roller 32 is driven by means of a sprocket 34 on its spindle 35, chain 36, and sprocket 37 on a driving shaft 38 suitably journalled in frame 1 as shown. Shaft 38 is driven through a bevel gear 39 on shaft 38 and a mating bevel gear 40 on a stub shaft 41.

Means are provided for imparting periodical rotation to stub shaft 41 to thereby drive the conveyor 31 intermittently, such means comprising a sprocket 42 on stub shaft 41, and a chain 43 on sprocket 42. Chain 43 has a weight 44 fixed to one end thereof and its other end is attached to the free end of an arm 45 pivoted to the frame at 46. Up and down swinging movement is imparted to arm 45 by means of a connecting rod 47 having one end connected to arm 45 at 48 and its other end pivoted eccentrically to a disc 49 fixed to shaft 19.

It will thus be apparent that shaft 19 drives both connecting rods 13 and 47, the action of which may be readily synchronized whereby during the upward stroke of the saw, the conveyor is actuated to move a piece of wood thereon into the path of the saw for sawing thereby on the subsequent downward stroke of the saw. Sprocket 42 is connected to shaft 41 through a ratchet 50 whereby on downward stroke of connecting rod 47 the sprocket 42 rotates the shaft 41 whereas on upward stroke of the connecting rod 47 the sprocket 42 is free to rotate with respect to shaft 41 under the influence of weight 44.

Means for holding the wood piece during the sawing operation thereon comprises a weighted hold down bar 51 having a serrated lower edge 52 and slidably mounted for substantially vertical movement on a pair of rods 53 mounted on the frame 1. The hold down bar 51 is actuated by means of a cable or the like 54 connected thereto and to the free end of auxiliary frame 6 through suitably positioned pulleys 55 mounted in the frame. As shown, the horizontally extending portion of cable 51 is led through a guard pipe 56. It will be apparent that, as the saw and adjacent end of frame 6 move downwardly in a sawing stroke, upward movement of the other end of frame 6 will permit the hold down bar 51 to move downwardly to grip a piece of wood extending into the path of the saw. The upward stroke of the saw and adjacent end of frame 6 will result in downward movement of the other end of frame 6 and consequent upward movement of the hold down bar 51 to release the piece of wood held thereby and permit movement of the wood piece by the conveyor.

The fulcrum point 46 of arm 45 may be varied as desired and for this purpose the arm may be provided with a plurality of holes 57 whereby adjustment of this point may be readily accomplished. It will be apparent that travel of the conveyor (or length of cut) is determined by the position of fulcrum point 46. A satisfactory provision of adjustment thereof is to render to variable in increments of 4 inches from 12 inches to thirty-six inches.

The conveyor 31 may be made in any desired length to suit its particular location.

It will be observed that a simple automatically operable sawing machine has been provided. Operation is very rapid since during the upward stroke of the saw the conveyor is actuated to move a piece of wood into its path ready for sawing during the downward working stroke. The length of cut is conveniently and rapidly adjustable in the manner described.

The machine is readily capable of construction from heavy steel parts and thus may be built to withstand long periods of trouble free operation.

I claim:

A sewing machine comprising a main frame, a driven shaft journalled in said frame, an auxiliary frame, said shaft extending transversely of and rotatably journalled in said auxiliary frame intermediate opposite end portions of the latter, a circular saw having an arbor journalled in one end of said auxiliary frame, first means drivingly connecting said arbor and said shaft, a conveyor belt mechanism having a discharge end directed across said one end of said auxiliary frame, means for effecting rocking movement of said auxiliary frame about its axis of rotation, comprising a crankshaft journalled in said main frame, second means drivingly connecting said crankshaft to said driven shaft, and a first rod connecting said crankshaft to a point on said auxiliary frame spaced longitudinally from its axis of rotation toward one end of said auxiliary frame, a lever arm, means pivotally securing said lever arm to said main frame for movement about an axis extending transversely of said lever arm, said lever arm including a work arm and a power arm, a second rod connecting the power arm of said lever arm to said crankshaft, a driving shaft drivingly connected to said conveyor, lost motion connecting means secured between said driving shaft and the work arm of said lever effecting intermittent advancement of said conveyor belt mechanism in response to rotation of said crankshaft, said pivotal securing means including means for adjusting the fulcrum of said lever longitudinally therealong whereby the distance said conveyor mechanism advances each full cycle of movement of said second connecting rod may be adjusted, wood piece clamping means comprising a bar slidably mounted for vertical movement in said main frame above and transversely of said conveyor belt mechanism, a cable connected to said bar and to a point on said auxiliary frame spaced longitudinally from its axis of rotation toward the other end of said auxiliary frame to impart up and down movement to said bar in response to rocking movement of said auxiliary frame, said second connecting means including meshed eccentric gears whereby cyclically varying speed is imparted to said crankshaft, said first rod connecting said crankshaft to said auxiliary frame including a lost motion connection with said auxiliary frame for positive movement thereof only to raise said circular saw thereby enabling the weight of the end of the auxiliary frame supporting the circular saw to effect the cutting of a wood piece disposed on said conveyor belt mechanism in alignment with the path of movement of said circular saw, said eccentric gears being meshed to effect rapid raising of said one end of said auxiliary frame and said circular saw and relatively slow lowering of said one end of said auxiliary frame and said circular saw to cut a wood piece supported by said conveyor belt mechanism.

References Cited in the file of this patent

UNITED STATES PATENTS

| | | |
|---|---|---|
| 293,037 | Kautz | Feb. 5, 1884 |
| 483,998 | Fischer | Oct. 11, 1892 |
| 515,388 | Whitney | Feb. 27, 1894 |
| 632,100 | Carson | Aug. 29, 1899 |
| 1,522,940 | Breeze | Jan. 13, 1925 |
| 2,410,887 | Locke | Nov. 12, 1946 |
| 2,614,589 | Coats et al. | Oct. 21, 1952 |

FOREIGN PATENTS

| | | |
|---|---|---|
| 885,147 | France | May 17, 1943 |
| 906,581 | France | May 22, 1945 |